(12) United States Patent
Choi et al.

(10) Patent No.: US 10,447,669 B2
(45) Date of Patent: *Oct. 15, 2019

(54) SYSTEM AND METHOD FOR KEY EXCHANGE BASED ON AUTHENTICATION INFORMATION

(71) Applicant: SAMSUNG SDS CO., LTD., Seoul (KR)

(72) Inventors: Kyu-Young Choi, Seoul (KR); Ji-Hoon Cho, Seoul (KR); Hyo-Jin Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 179 days.

This patent is subject to a terminal disclaimer.

(21) Appl. No.: 15/140,625

(22) Filed: Apr. 28, 2016

(65) Prior Publication Data

US 2016/0330179 A1  Nov. 10, 2016

(30) Foreign Application Priority Data

May 6, 2015  (KR) ........................ 10-2015-0062864

(51) Int. Cl.
*H04L 9/32* (2006.01)
*H04L 29/06* (2006.01)
*H04L 9/08* (2006.01)

(52) U.S. Cl.
CPC .......... *H04L 63/061* (2013.01); *H04L 9/0838* (2013.01); *H04L 9/0844* (2013.01);
(Continued)

(58) Field of Classification Search
CPC combination set(s) only.
See application file for complete search history.

(56) References Cited

U.S. PATENT DOCUMENTS 6,246,771 B1* 6/2001 Stanton ................. H04L 9/0894
380/286
9,515,825 B2* 12/2016 Yoon ..................... H04L 9/0844
(Continued)

FOREIGN PATENT DOCUMENTS

KR  10-2014-0055509 A  5/2014
KR  10-2014-0057134 A  5/2014

OTHER PUBLICATIONS

"Shweta Arora, Muzzammil Hussain, Secure Session Key Sharing Using Symmetric Key Cryptography, Sep. 19-22, 2018, IEEE, INSPEC#18305845" (Year: 2018).*
(Continued)

*Primary Examiner* — Phy Anh T Vu
(74) *Attorney, Agent, or Firm* — Sughrue Mion, PLLC

(57) ABSTRACT

Disclosed are a system and method for key exchange based on user authentication information. The system for key exchange based on user authentication information includes a client configured to generate ciphertext corresponding to authentication information of a user of the client using a random number for the client and server identification information, and a server configured to decrypt the ciphertext received from the client using a private key for the server corresponding to the server identification information to restore the authentication information, authenticate the client using the restored authentication information, and generate a session key for the server corresponding to the authenticated client.

29 Claims, 7 Drawing Sheets

(52) U.S. Cl.
CPC .......... *H04L 9/0869* (2013.01); *H04L 9/3226* (2013.01); *H04L 9/3239* (2013.01); *H04L 63/0428* (2013.01); *H04L 63/0823* (2013.01)

(56) References Cited

U.S. PATENT DOCUMENTS

| | | | | |
|---|---|---|---|---|
| 2002/0042884 | A1* | 4/2002 | Wu | G06F 21/645 726/10 |
| 2004/0210756 | A1* | 10/2004 | Mowers | H04L 63/0807 713/168 |
| 2005/0071677 | A1* | 3/2005 | Khanna | G06F 21/575 726/4 |
| 2009/0296938 | A1* | 12/2009 | Devanand | H04L 9/0631 380/278 |
| 2010/0211779 | A1* | 8/2010 | Sundaram | H04L 9/0847 713/168 |
| 2012/0272064 | A1* | 10/2012 | Sundaram | H04L 9/0894 713/171 |
| 2014/0122888 | A1* | 5/2014 | Yoon | H04L 9/0844 713/171 |
| 2014/0192976 | A1 | 7/2014 | Yoon et al. | |
| 2015/0319149 | A1* | 11/2015 | Alshammari | H04L 9/0869 713/171 |
| 2016/0087797 | A1* | 3/2016 | Barbir | H04L 9/3226 713/171 |
| 2016/0352710 | A1* | 12/2016 | Hibshoosh | H04L 63/061 |

OTHER PUBLICATIONS

"Ruhnna Tahir, Huosheng Hu, Dongbing Gu, Klaus McDonald-Maier, A scheme for the Generation of Strong ICMetrics based Session Key Pairs for Secure Embedded System Applications, Mar. 25-28, 2013, IEEE, INSPEC#13614918" (Year: 2013).*

"Fengxiu Gao, Fushan Wei, Chuangui Ma, Gateway-Oriented Password-Authenticated Key Exchange BAsed on Chameleon Hash Function, Sep. 21023, 2012, IEEE, INSPEC#13384385" (Year: 2012).*

"Ahmad Abusukhon, Zeyad Mohammad, Ali Al-Thaler, Efficient and Secure Key Exchange Protocol Based on Elliptical Curve and Security Models, Apr. 9-11, 2019, INSPEC#18691547" (Year: 2019).*

Communication dated May 27, 2016 issued by Korean Intellectual Property Office in counterpart Korean Application No. 10-2015-0062864.

* cited by examiner ized into PAKE based on a public key certificate and PAKE based on a non-pubic key certificate.

SYSTEM AND METHOD FOR KEY EXCHANGE BASED ON AUTHENTICATION INFORMATION

CROSS-REFERENCE TO RELATED APPLICATION

This application claims priority to and the benefit of Korean Patent Application No. 10-2015-0062864, filed on May 6, 2015, the disclosure of which is incorporated herein by reference in its entirety.

BACKGROUND

1. Field

Embodiments of the present disclosure relate to a network security technology.

2. Discussion of Related Art

A key exchange protocol based on authentication information (that is, password authenticated key exchange (PAKE)) is a process in which two or more parties participating in communication share a key for encrypted communication on the basis of a password that at least one of the parties knows. Depending on its implementation method, PAKE may be classified into PAKE based on a public key certificate and PAKE based on a non-pubic key certificate.

PAKE based on a public key certificate involves a process of always performing pubic key authentication for key exchange. In particular, PAKE based on a non-public key certificate (associated standards: IEEE P1363.2 and ISO/IEC 11770-4) has a configuration scheme with a verifier in which a password is directly exponentiated and stored and thus a migration of an existing system and an update of a parameter are difficult. Also, this scheme needs a relatively large amount of real-time calculations in order to correspond to an offline analysis, and cannot flexibly change a message flow of a protocol because a password is directly combined with a group parameter.

SUMMARY

Embodiments of the present disclosure are directed to an efficient authentication and key exchange protocol having all advantages of password authenticated key exchange (PAKE) based on a public key certificate and PAKE based on a non-public key certificate by applying an ID-based encryption technology to an existing key exchange protocol based on authentication information.

Embodiments of the present disclosure are also provided to minimize the number of communications needed for authentication and key exchange.

According to an aspect of the present disclosure, there is provided a system for key exchange based on user authentication information, the system including: a client configured to generate ciphertext corresponding to authentication information of a user using a random number for the client and server identification information; and a server configured to decrypt the ciphertext received from the client using a private key for the server corresponding to the server identification information to restore the authentication information, authenticate the client using the restored authentication information, and generate a session key for the server corresponding to the authenticated client.

The client may calculate a first session key element from the random number for the client, generate an encryption element for the client from the server identification information and the random number for the client, and combine the authentication information with the encryption element for the client to generate an encrypted character string.

The encryption element for the client may be calculated using the following equation:

$$D = (H(ID_S))^x$$

where D is the encryption element for the client, IDs is the server identification information, x is the random number of the client, and H is a one-way hash value.

The encrypted character string may be calculated by an exclusive-OR (XOR) of the authentication information and the encryption element for the client.

The server may receive ciphertext including the first session key element and the encrypted character string from the client, calculate an encryption element for the server from the private key for the server and the first session key element, and restore the authentication information from the encrypted character string using the encryption element for the server.

The encryption element for the server may be calculated using the following equation:

$$D' = X^{K_s}$$

where D' is the encryption element for the server, X is the first session key element, and Ks is the private key of the server.

The authentication information may be restored through an XOR operation of the received encrypted character string and the encryption element for the server.

The server may authenticate the client according to whether the restored authentication information is the same as authentication information of the client that is pre-stored in the server.

The session key for the server may be a hash value of a character string including one or more of client identification information, the server identification information, the encrypted character string, the first session key element, and the encryption element for the server.

The client may generate a session key for the client composed of the hash value of the character string including one or more of the client identification information, the server identification information, the encrypted character string, the first session key element, and the encryption element for the client.

The server may transmit a random message to the client when the client is authenticated, and the session key for the server and the session key for the client may additionally include the random message.

When the client is authenticated, the server may calculate a second session key element from a random number for the server and generate a third session key element for the server from the random number for the server and the first session key element.

The third session key element for the server may be calculated by raising a base of the first session key element to a power of the random number for the server.

The client may receive the second session key element from the server and generate a third session key element for the client and a session key for the client from the received second session key element.

The third session key element for the client may be calculated by raising a base of the second session key element to a power of the random number for the client.

The session key for the client may be a hash value of a character string including one or more of the client identification information, the server identification information, the encrypted character string, the first session key element, the second session key element, the encryption element for the client, and the third session key element for the client.

The session key for the server may be a hash value of a character string including one or more of the client identification information, the server identification information, the encrypted character string, the first session key element, the second session key element, an encryption element for the server, and the third session key element for the server.

According to another aspect of the present disclosure, there is provided a method for key exchange based on user authentication information, the method including: generating, by a client, ciphertext corresponding to authentication information of a user using a random number for the client and server identification information; decrypting, by a server, the ciphertext received from the client using a private key for the server corresponding to the server identification information to restore the authentication information; authenticating, by the server, the client using the restored authentication information; and generating, by the server, a session key for the server corresponding to the client when the client is authenticated.

The generating of the ciphertext may further include: calculating a first session key element from the random number for the client; generating an encryption element for the client from the server identification information and the random number for the client; and combining the authentication information with the encryption element for the client to generate an encrypted character string.

The encryption element for the client may be calculated using the following equation:

$$D=(H(ID_S))^x$$

where D is the encryption element for the client, IDs is the server identification information, x is the random number of the client, and H is a one-way hash value.

The encryption character string may be calculated by an exclusive-OR (XOR) of the authentication information and the encryption element for the client.

The restoring of the authentication information may further include: receiving ciphertext including the first session key element and the encrypted character string from the client; calculating an encryption element for the server from the private key for the server and the first session key element; and restoring the authentication information from the encrypted character string using the encryption element for the server.

The encryption element for the server may be calculated using the following equation:

$$D'=X^{Ks}$$

where D' is the encryption element for the server, X is the first session key element, and Ks is the private key for the server.

The restoring of the authentication information from the encryption character string may include restoring the authentication information through an XOR operation of the received encrypted character string and the encryption element for the server.

The authenticating may include authenticate the client according to whether the restored authentication information is the same as authentication information of the client that is pre-stored in the server.

The session key for the server may be a hash value of a character string including one or more of client identification information, the server identification information, the encrypted character string, the first session key element, and the encryption element for the server.

The client may generate a session key for the client composed of the hash value of the character string including one or more of the client identification information, the server identification information, the encrypted character string, the first session key element, and the encryption element for the client.

The server may transmit a random message to the client when the client is authenticated, and the session key for the server and the session key for the client may additionally include the random message.

The generating of the session key of the server may further include: calculating a second session key element from a random number for the server; and generating a third session key element for the server from the random number for the server and the first session key element.

The third session key element for the server may be calculated by raising a base of the first session key element to a power of the random number for the server.

The client may receive the second session key element from the server and generate a third session key element for the client and a session key for the client from the received second session key element.

The third session key element for the client may be calculated by raising a base of the second session key element to a power of the random number for the client.

The session key for the client may be a hash value of a character string including one or more of the client identification information, the server identification information, the encrypted character string, the first session key element, the second session key element, the encryption element for the client, and the third session key element for the client.

The session key for the server may be a hash value of a character string including one or more of the client identification information, the server identification information, the encrypted character string, the first session key element, the second session key element, the encryption element for the server, and the third session key element for the server.

According to still another aspect of the present disclosure, there is provided a computer program stored in a medium that is combined with hardware and configured to execute a method, the method including: generating ciphertext corresponding to authentication information of a user of a client using a random number for the client and server identification information; decrypting the ciphertext received from the client using a private key for the server corresponding to the server identification information to restore the authentication information; authenticating the client using the restored authentication information; and generating a session key for the server corresponding to the client when the client is authenticated.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. However, the embodiments are only exemplary, and the present disclosure is not limited thereto.

In describing embodiments of the present disclosure, when it is determined that a detailed description of known techniques associated with the present disclosure would unnecessarily obscure the gist of the present disclosure, the detailed description will be omitted. Also, terms used herein are defined in consideration of the functions of the present disclosure and may be changed depending on a user, the intent of an operator, or a custom. Accordingly, the terms should be defined on the basis of the following overall description of this specification.

The technical scope of the present disclosure is defined by the claims, and the following embodiments are intended only to efficiently explain the technical scope of the present disclosure to those who skilled in the art.

Figure 1:
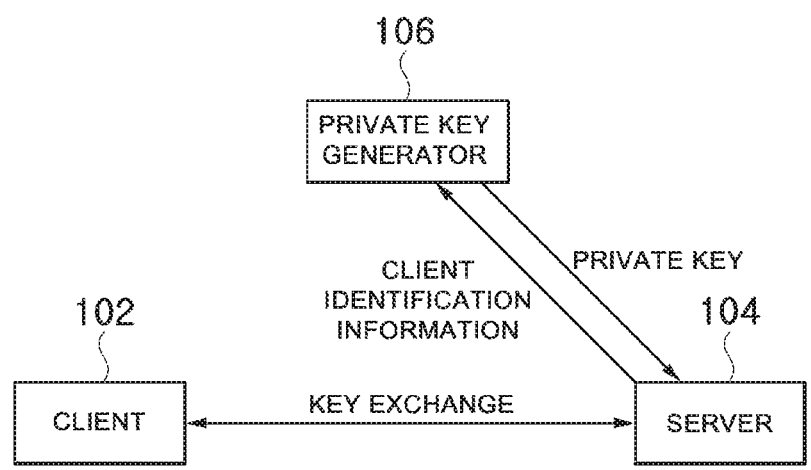
FIG. 1 is a block diagram for describing an authentication information-based authentication system according to a first embodiment of the present disclosure.

FIG. 1 is a block diagram for describing an authentication-information-based authentication system 100 according to a first embodiment of the present disclosure. As shown in FIG. 1, the authentication-information-based authentication system 100 includes a client 102, a server 104, and a private key generator 106.

The client 102 selects a random number x for the client 102, and generates ciphertext X, W corresponding to authentication information of a user of the client 102 using the random number x for the client 102 and server identification information IDs. According to an embodiment of the present disclosure, the server identification information IDs of the server 104 is information that is assigned to identify the server 104 over a network and may include, for example, a media access control (MAC) address or an Internet protocol (IP) address of the server 104 or a certificate of the server 104. In addition, the authentication information of the user of the client 102 may include all kinds of information needed to authenticate the user, such as a password, fingerprint information, and the like of the user.

When the ciphertext X, W is generated, the client 102 requests authentication from the server 104 by transmitting the ciphertext X, W to the server 104.

The server 104 stores and manages the authentication information of the user of the client 102. Here, the authentication information may include all information needed to authenticate the user, such as a password, fingerprint information, and the like of the user. According to an embodiment, the user of the client 102 may set client identification information IDc and a password pw, and may register the client identification information IDc and the password pw with the server 104. According to an embodiment, the client identification information IDc may be an ID or a certificate of the user of the client 102.

In some embodiments, the user of the client 102 may register the password pw as it is. In other embodiments, in order to enhance security, the user of the client 102 may register a one-way hash value H(pw) of the password or a message authentication code (MAC) value $MAC_k(pw)$ that is calculated using a separate hardware security module (HSM) instead of the password pw itself. For convenience of the following description, it is assumed that the authentication information is the one-way hash value of the password H(pw).

The server 104 decrypts the ciphertext X, W received from the client 102 using a private key Ks for the server 104 corresponding to the server identification information IDs to restore the authentication information of the user. The server 104 compares the restored authentication information with the authentication information pre-registered with the server 104 to authenticate the client 102. That is, the server 104 may directly authenticate the client 102 through the authentication information of the client 102 that is included in the ciphertext X, W received from the client 102. In addition, since the decryption of the ciphertext X, W is only performed by the server 104, the client 102 also implicitly authenticates the server 104 through the authentication process.

When the client 102 is successfully authenticated, the server 104 generates a session key sk for communication with the authenticated client 102. In addition, the server 104 selects a random number y for the server 104 and transmits a second session key element Y that is generated from the selected random number y for the server 104 to the client 102. Upon receiving the second session key element Y, the client 102 generates the same session key sk as that of the server 104, using the second session key element Y and information that is used in the authentication process.

The private key generator 106 receives the server identification information IDs from the server 104 and issues the private key Ks for the server 104 corresponding to the received identification information IDs. The stored private key Ks for the server 104 is used to decrypt the ciphertext X, W received from the client 102 in a subsequent authentication process.

According to an example embodiment, the private key generator 106 may calculate the private key Ks for the server 104 corresponding to the server identification information IDs on the basis of predetermined system parameters, its own master key, and pre-calculated data corresponding to a trapdoor discrete logarithm (TDL) group. The method of generating the private key Ks for the server 104 will be described below in detail.

The above described modules of the authentication-information-based authentication system 100 may be implemented with hardware. For example, the authentication-information-based authentication system 100 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the client 102, the server 104, and the private key generator 106 of the authentication-information-based authentication system 100 may be implemented as hardware of the above-described computing apparatus.

Figure 2:
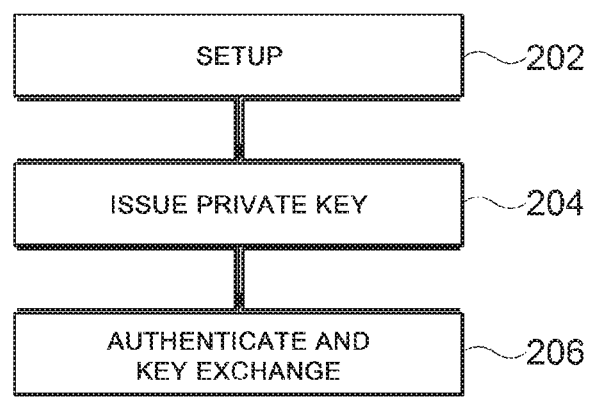
FIG. 2 is a flowchart for describing all steps of an authentication-information-based authentication algorithm according to the first embodiment of the present disclosure.

An authentication method performed by the authentication-information-based authentication system 100 having the above-described configuration will be described in detail. As shown in FIG. 2, an authentication-information-based authentication method 200 according to the first embodiment of the present disclosure includes three steps, that is, setup (S202), key extraction (S204), and authentication and key exchange (S206). In setup (S202), all elements of the entire system are defined. In key extraction (S204), the private key generator 106 generates a private key Ks for the server 104 corresponding to server identification information IDs on the basis of a master key according to a request of the server 104. In authentication and key exchange (S206), authentication is performed between the client 102 and the server 104, and a session key sk is generated from the authentication.

Setup (S202)

Setup (S202) includes defining a parameter and a master key for authentication and key exchange between the client 102 and the server 104.

First, N=pq is calculated from two large prime numbers p and q having similar sizes, which respectively satisfy p≡3 (mod 4) and q≡3 (mod 4) and are B-smooth. Here, each of p and q is a prime number that is cryptologically safe and satisfies a security level corresponding to a given stability parameter. The stability parameter denotes an algorithm factor that determines time and cost of a basic attack against an encryption algorithm. Here, the basic attack denotes an exhaustive search attack, which searches for all possible key candidates until a key that satisfies given data (that is, plaintext and ciphertext) is found. A time taken for the exhaustive search depends on the number of possible keys, and the number of possible keys is determined according to a length of the keys. Thus, the stability parameter denotes the length of the keys. Also, B may be appropriately set according to a security level.

Next, a hash function H and a random hash function h are defined. It is assumed that a generator of a maximal cyclic subgroup of a finite group $Z_N=\{0, 1, 2, \ldots, N-1\}$ is ĝ. When a cyclic subgroup generated by a generator g=ĝ² is defined as G, the hash function H is defined as Equation 1 below:

$$H:\{0,1\}^* \to G \qquad \text{[Equation 1]}$$

where $\{0, 1\}^*$ is any finite bit string consisting of 0s and 1s.

That is, the hash function H is defined such that an output value is an element of a group G when a given ID is considered as an input value. For example, when there is a random hash function h':$\{0,1\}^* \to Z_n$, the hash function H may be defined as Equation 2 below:

$$H(ID)=h'(ID)^2. \qquad \text{[Equation 2]}$$

In addition, the random hash function h is defined as Equation 3 below:

$$h:\{0,1\}^* \to \{0,1\}^n \qquad \text{[Equation 3]}$$

where $\{0,1\}^n$ is a character string of n bits consisting of any bits of 0s and 1s.

For example, SHA1, SHA-256, SHA-512, or the like may be used as the random hash function. However, the present disclosure is not limited thereto.

A system parameter param and a master key mk that are derived through the above process are as follows:

param={N, G, g, H, h} mk=(p, q).

Key Extraction (S204)

In this step, the private key generator 106 issues a private key Ks for the server 104 on the basis of server identification information IDs received from the server 104. The private key generator 106 calculates a private key Ks corresponding to a given ID on the basis of the system parameter param, the master key mk, and the pre-calculated data corresponding to a trapdoor discrete logarithm (TDL) group. A discrete logarithm calculation is cryptologically impossible. However, when a trapdoor is known, there is a group in which a discrete logarithm value may be easily calculated. This is called the TDL group. According to an embodiment of the present disclosure, a private key corresponding to each ID is calculated using such a property of the TDL group. That is, the private key generator 106 stores the pre-calculated data regarding values corresponding to the master key mk and the TDL group, for example, in the form of a table, and calculates a private key Ks corresponding to a received ID by using the received ID and the pre-calculated data stored in the table. For example, the private key generator 106 may calculate the private key Ks for the server 104 as in Equation 4 below:

$$Ks=\log_g(H(ID_S)). \qquad \text{[Equation 4]}$$

The calculated private key Ks is transferred to the server 104 through a safe channel.

Authentication and Key Exchange (S206)

In this step, authentication is performed between the client 102 and the server 104, and a session key sk is generated.

Figure 3:
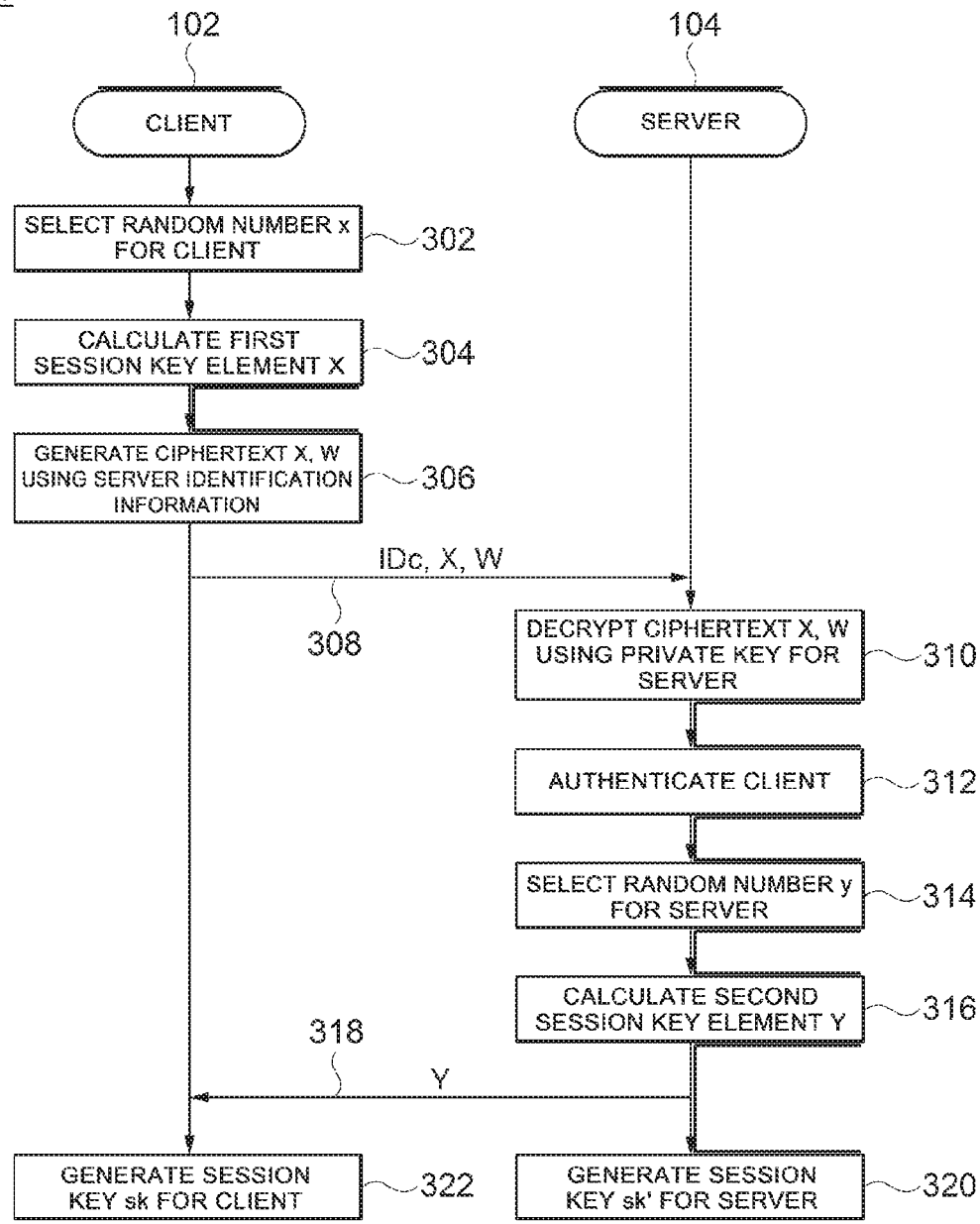
FIG. 3 is a flowchart for describing an authentication and key exchange process of the authentication-informationbased authentication algorithm according to the first embodiment of the present disclosure.

FIG. 3 is a flowchart for describing an authentication and key exchange process (S206) according to the first embodiment of the present disclosure.

In S302, the client 102 selects any random number x for the client 102 from the group $Z_N$ according to the system parameters defined in S202.

In S304, the client 102 calculates a first session key element X from the random number x for the client 102. Here, the first session key element X may be calculated as in Equation 5 below:

$$X=g^x \qquad \text{[Equation 5]}$$

where g is a generator of the cyclic subgroup G, N is an integer that satisfies N=pq, and p and q are prime numbers that respectively satisfy p≡3 (mod 4) and q≡3 (mod 4).

In S306, the client 102 generates ciphertext X, W using server identification information IDs. Here, the ciphertext X, W denotes a value obtained by encrypting the authentication information of the user of the client 102. In addition, the ciphertext X, W may additionally include a value (for example, $g^x$) needed to generate the session key sk other than the authentication information. The ciphertext X, W will be described in detail as follows.

First, the client 102 generates an encryption element D for the client 102 using the server identification information IDs and the random number x for the client 102, as in Equation 6 below:

$$D=(H(ID_S))^x \qquad \text{[Equation 6]}$$

where D is the encryption element for the client, IDs is the server identification information, x is the random number for the client, and H is a one-direction hash value.

Subsequently, the client 102 combines the authentication information with the encryption element D for the client 102 to generate an encrypted character string W. When it is assumed that the authentication information is a one-direction hash value H(pw) of a user password, the encrypted character string W may be calculated by an exclusive-OR (XOR) of the authentication information and the encryption element D for the client 102 as in Equation 7 below:

$$W=D \text{ XOR } H(pw). \qquad \text{[Equation 7]}$$

In S308, the client 102 transmits the ciphertext X, W including the first session key element X and the encrypted character string W to the server 104, in addition to client identification information IDc.

In S310, the server 104 decrypts the received ciphertext X, W using the private key Ks for the server 104. In detail, the server 104 calculates an encryption element D' for the server 104 using the private key Ks for the server 104 and the first session key element X, as in Equation 8 below:

$$D'=X^{Ks} \qquad \text{[Equation 8]}$$

where D' is the encryption element for the server, X is the first session key element, and Ks is the private key for the server.

Here, when the private key Ks for the server 104 is normally generated from the server identification information IDs, the encryption element D' for the server 104 has the same value as the encryption element D for the client 102.

Next, the server 104 restores the authentication information from the encrypted character string W using the encryption element D' for the server 104. This may be expressed as Equation 9 below:

$$H'(pw)=W \text{ XOR } D'. \qquad \text{[Equation 9]}$$

That is, the authentication information may be restored through an XOR operation of the received encrypted character string W and the encryption element D' for the server.

In S312, the server 104 authenticates the client 102 according to whether restored authentication information H'(pw) is the same as the authentication information H(pw) of the client 102 that is prestored in the server 104. When H'(pw) is the same as H(pw), the server 104 determines that the client 102 is authenticated, and otherwise, the server 104 determines that the client 102 is not authenticated.

In addition, as described above, when the server 104 does not have an accurate private key Ks for the server 104 corresponding to the server identification information IDs, S310 cannot be properly performed. Accordingly, the client 102 may also indirectly authenticate the server 104 according to a result of the authentication.

In S314, the server 104 selects any random number y for the server 104 from the group $Z_N$ according to system parameters that are defined in S202.

In S316, the server 104 calculates a second session key element Y from the random number y for the server 104. The second session key element Y may be calculated as in Equation 10 below:

$$Y=g^y \qquad \text{[Equation 10]}$$

where g is a generator of the cyclic subgroup G, N is an integer that satisfies N=pq, and p and q are prime numbers that respectively satisfy p≡3 (mod 4) and q≡3 (mod 4).

In S318, the server 104 sends the generated second session key element Y to the client 102.

In S320, the server 104 generates a session key sk' for the server 104 using information generated or exchanged in the previous steps.

In detail, the server 104 generates a third session key element Z' for the server 104 from the random number y for the server 104 and the first session key element X as in Equation 11 below:

$$Z'=X^y. \qquad \text{[Equation 11]}$$

Next, the server 104 generates the session key sk' for the server 104 by hashing a character string including one or more of the client identification information IDc, the server identification information IDs, the encrypted character string W, the first session key element X, the second session key element Y, the encryption element D' for the server 104, and the third session key element Z' for the server 104. For example, the session key sk' for the server 104 may be generated using Equation 12 below:

$$sk'=H(IDc,IDs,W,X,Y,D',Z'). \qquad \text{[Equation 12]}$$

In S322, the client 102 also generates a session key sk for the client 102 using the information generated or exchanged in the previous steps.

In detail, the client 102 generates a third session key element Z for the client 102 from the random number x for the client 102 and the second session key element Y, as in Equation 13 below:

$$Z=Y^x. \qquad \text{[Equation 13]}$$

Here, the third session key element Z for the client 102 is the same as the third session key element Z' for the server 104.

Next, the client 102 generates the session key sk for the client 102 by hashing a character string including one or more of the client identification information IDc, the server identification information IDs, the encrypted character string W, the first session key element X, the second session key element Y, the encryption element D for the client 102, and the third session key element Z for the client 102. For example, the session key sk for the client 102 may be generated using Equation 14 below:

$$sk=H(IDc,IDs,W,X,Y,D,Z). \qquad \text{[Equation 14]}$$

As described above, since the encryption element D for the client 102 and the third session key element Z for the client 102 are the same as the encryption element D' for the server 104 and the third session key element Z' for the server 104, respectively, the session key sk for the client 102 is the same as the session key sk' for the server 104. That is, through the above-described process, the client 102 and the server 104 may share a session key for safe communication therebetween without directly transmitting or receiving the key.

Figure 4:
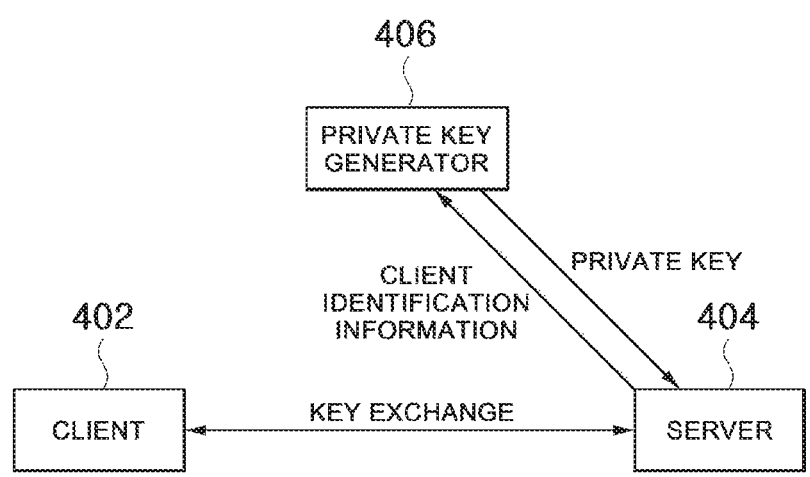
FIG. 4 is a block diagram for describing an authentication information-based authentication system according to a second embodiment of the present disclosure.

FIG. 4 is a block diagram for describing an authentication-information-based authentication system 400 according to a second embodiment of the present disclosure. As shown in FIG. 4, the authentication-information-based authentication system 400 includes a client 402, a server 404, and a private key generator 406.

The client 402 selects a random number x for the client 402, and generates ciphertext X, W corresponding to authentication information of a user of the client 402 using the random number x for the client 402 and server identification information IDs. According to an embodiment of the present disclosure, the server identification information IDs of the server 404 may be, for example, a media access control (MAC) address or an Internet protocol (IP) address of the server 404 or a certificate of the server 404. In addition, the authentication information of the user of the client 402 may include all kinds of information needed to authenticate the user, such as a password, fingerprint information, and the like of the user.

When the ciphertext X, W is generated, the client 402 requests authentication from the server 404 by transmitting the ciphertext X, W to the server 404.

The server 404 stores and manages the authentication information of the user of the client 402. Here, the authentication information may include all information needed to authenticate the user, such as a password, fingerprint information, and the like of the user. According to an embodiment, the user of the client 402 may set client identification information IDc and a password pw, and may register the client identification information IDc and the password pw with the server 404. According to an embodiment, the client identification information IDc may be an ID or a certificate of the user of the client 402.

The user of the client 402 may register the password pw as is. However, in order to enhance security, the user of the client 102 may register a one-way hash value H(pw) of the password or a message authentication code (MAC) value $MAC_k(pw)$ that is calculated using a separate HSM instead of the password pw. For convenience of the following description, it is assumed that the authentication information is the one-way hash value of the password H(pw).

The server 404 decrypts the ciphertext X, W received from the client 402 using a private key Ks for the server 404 corresponding to the server identification information IDs to restore the authentication information of the user. The server 404 compares the restored authentication information with the authentication information pre-registered with the server 404 to authenticate the client 402. That is, the server 404 may directly authenticate the client 402 through the authentication information of the client 402 that is included in the ciphertext X, W received from the client 402. In addition, since the decryption of the ciphertext X, W is only performed by the server 404, the client 402 also implicitly authenticates the server 104 through the authentication process.

When the client 402 is successfully authenticated, the server 404 generates a session key sk for communication with the authenticated client 402.

The private key generator 106 receives the server identification information IDs from the server 104 and issues a private key Ks for the server 404 corresponding to the received server identification information IDs. The stored private key Ks for the server 104 is used to decrypt the ciphertext X, W received from the client 102 in a subsequent authentication process.

According to an embodiment, the private key generator 406 may calculate the private key Ks for the server 404 corresponding to the server identification information IDs on the basis of predetermined system parameters, its own master key, and pre-calculated data corresponding to a TDL group. The method of generating the private key Ks for the server 404 will be described below in detail.

Figure 5:
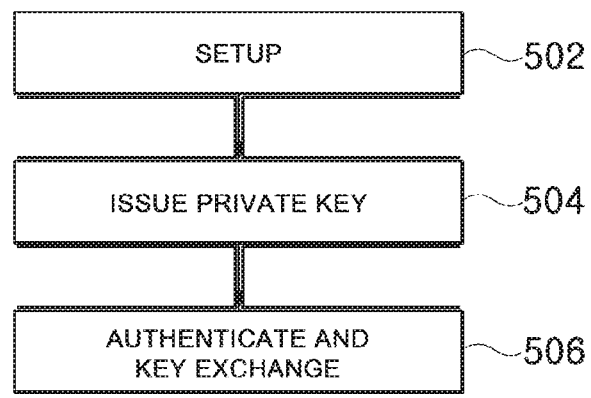
FIG. 5 is a flowchart for describing all steps of an authentication-information-based authentication algorithm according to the second embodiment of the present disclosure.

An authentication method performed by the authentication-information-based authentication system 400 having the above-described configuration will be described in detail. As shown in FIG. 5, an authentication-information-based authentication method 500 according to the second embodiment of the present disclosure includes three steps, that is, setup (S502), key extraction (S504), and authentication and key exchange (506). In setup (S502), all elements of the entire system are defined. In key extraction (S504), the private key generator 406 generates a private key Ks for the server 404 corresponding to the server identification information IDs on the basis of a master key according to a request of the server 404. In authentication and key exchange (S506), authentication is performed between the client 402 and the server 404, and a session key sk is generated from the authentication.

Setup 502 and key extraction 504 are substantially the same as setup 202 and key extraction 204 that are described above in the first embodiment. Thus their description will be omitted.

Figure 6:
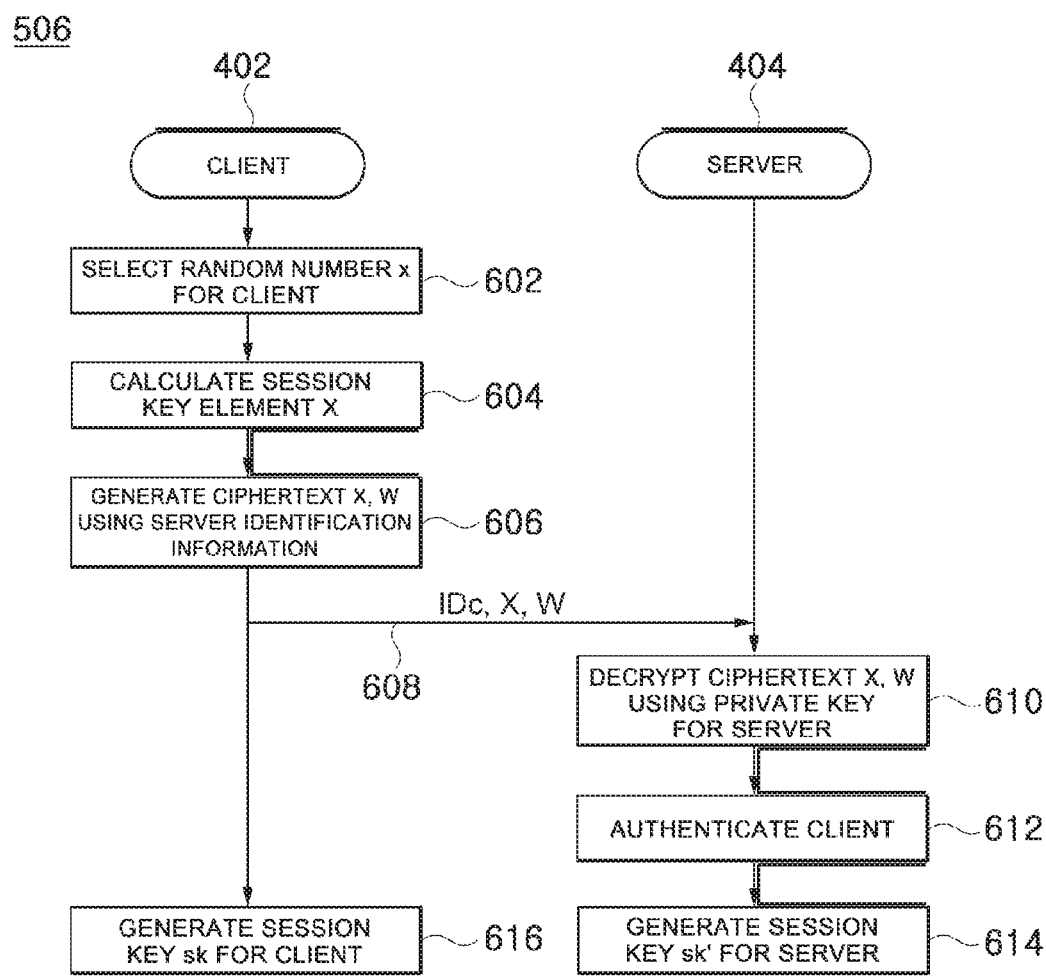
FIG. 6 is a flowchart for describing in detail an authentication and key exchange process of the authentication-information-based authentication algorithm according to the second embodiment of the present disclosure.

In authentication and key exchange (S506), authentication is performed between the client 402 and the server 404, and a session key sk is generated. FIG. 6 is a flowchart for describing an authentication and key exchange process (S506) according to the second embodiment of the present disclosure.

In S602, the client 402 selects any random number x for the client 402 from a group $Z_N$ according to the system parameters defined in the setup (S502).

In S604, the client 402 calculates a session key element X from the random number x for the client 402. Here, the session key element X may be calculated as in Equation 15 below:

$$X = g^x \qquad \text{[Equation 15]}$$

where g is a generator of a cyclic subgroup G, N is an integer that satisfies N=pq, and p and q are prime numbers that respectively satisfy p≡3 (mod 4) and q≡3 (mod 4).

In S606, the client 402 generates ciphertext X, W using server identification information IDs. Here, the ciphertext X, W denotes a value obtained by encrypting the authentication information of the user of the client 402. In addition, the ciphertext X, W may additionally include a value (for example, $g^x$) needed to generate the session key sk other than the authentication information. The ciphertext X, W will be described in detail as follows.

First, the client 402 generates an encryption element D for the client 402 using the server identification information IDs and the random number x for the client 402, as in Equation 16 below:

$$D = (H(ID_S))^x \qquad \text{[Equation 16]}$$

where D is the encryption element for the client, IDs is the server identification information, x is the random number for the client, and H is a one-direction hash value.

Subsequently, the client 402 combines the authentication information with the encryption element D for the client 402 to generate an encrypted character string W. When it is assumed that the authentication information is a one-direction hash value H(pw) of a user password, the encrypted character string W may be calculated by an XOR operation of the authentication information and the encryption element D for the client 402 as in Equation 17 below:

$$W = D \oplus H(pw). \quad \text{[Equation 17]}$$

In S608, the client 402 transmits the ciphertext X, W including the session key element X and the encrypted character string W to the client 402, in addition to client identification information IDc.

In S610, the server 404 decrypts the received ciphertext X, W using the private key Ks for the server 404. In detail, the server 404 calculates an encryption element D' for the server 404 using the private key Ks for the server 404 and the session key element X, as in Equation 18 below:

$$D' = X^{Ks} \quad \text{[Equation 18]}$$

where D' is the encryption element for the server, X is the session key element, and Ks is the private key for the server.

Here, when the private key Ks for the server 404 is normally generated from the server identification information IDs, the encryption element D' for the server 404 has the same value as the encryption element D for the client 402.

Next, the server 404 restores the authentication information from the encrypted character string W using the encryption element D' for the server 404. This may be expressed as Equation 19 below:

$$H'(pw) = W \oplus D'. \quad \text{[Equation 19]}$$

That is, the authentication information may be restored through an XOR operation of the received encrypted character string W and the encryption element D' for the server 404.

In S612, the server 404 authenticates the client 402 according to whether the restored authentication information H'(pw) is the same as the authentication information H(pw) of the client 402 that is prestored in the server 404. When H'(pw) is the same as H(pw), the server 404 determines that the client 402 is authenticated, and otherwise, the server 104 determines that the client 102 is not authenticated.

In addition, as described above, when the server 404 does not have an accurate private key Ks for the server 404 corresponding to the server identification information IDs, S310 cannot be properly performed. Accordingly, the client 402 may also indirectly authenticate the server 404 according to a result of the authentication.

In S614, the server 404 generates a session key sk' for the server 404 using information generated or exchanged in the previous steps.

In detail, the server 404 generates the session key sk' for the server 404 by hashing a character string including one or more of the client identification information IDc, the server identification information IDs, the encrypted character string W, the session key element X, and the encryption element D' for the server 404. For example, the session key sk' for the server 404 may be generated using Equation 20 below:

$$sk' = H(IDc, IDs, W, X, D'). \quad \text{[Equation 20]}$$

In S616, the client 402 also generates a session key sk for the client 402 using the information generated or exchanged in the previous steps.

In detail, the client 402 generates the session key sk for the client 402 by hashing a character string including one or more of the client identification information IDc, the server identification information IDs, the encrypted character string W, the session key element X, and the encryption element D for the client 402. For example, the session key sk for the client 402 may be generated using Equation 21 below:

$$sk = H(IDc, IDs, W, X, D). \quad \text{[Equation 21]}$$

As described above, since the encryption element D for the client 402 is the same as the encryption element D' for the server 104, the session key sk for the client 402 is also the same as the session key sk' for the server 104. That is, through the above-described process, the client 402 and the server 404 may share a session key for safe communication therebetween without directly transmitting or receiving the key. In addition, according to an embodiment of the present disclosure, the key exchange may be performed by transmitting and receiving a message between the client 402 and the server 404 only once (1-pass), thus effectively decreasing the number of transmissions and receptions of a message for key exchange.

Figure 7:
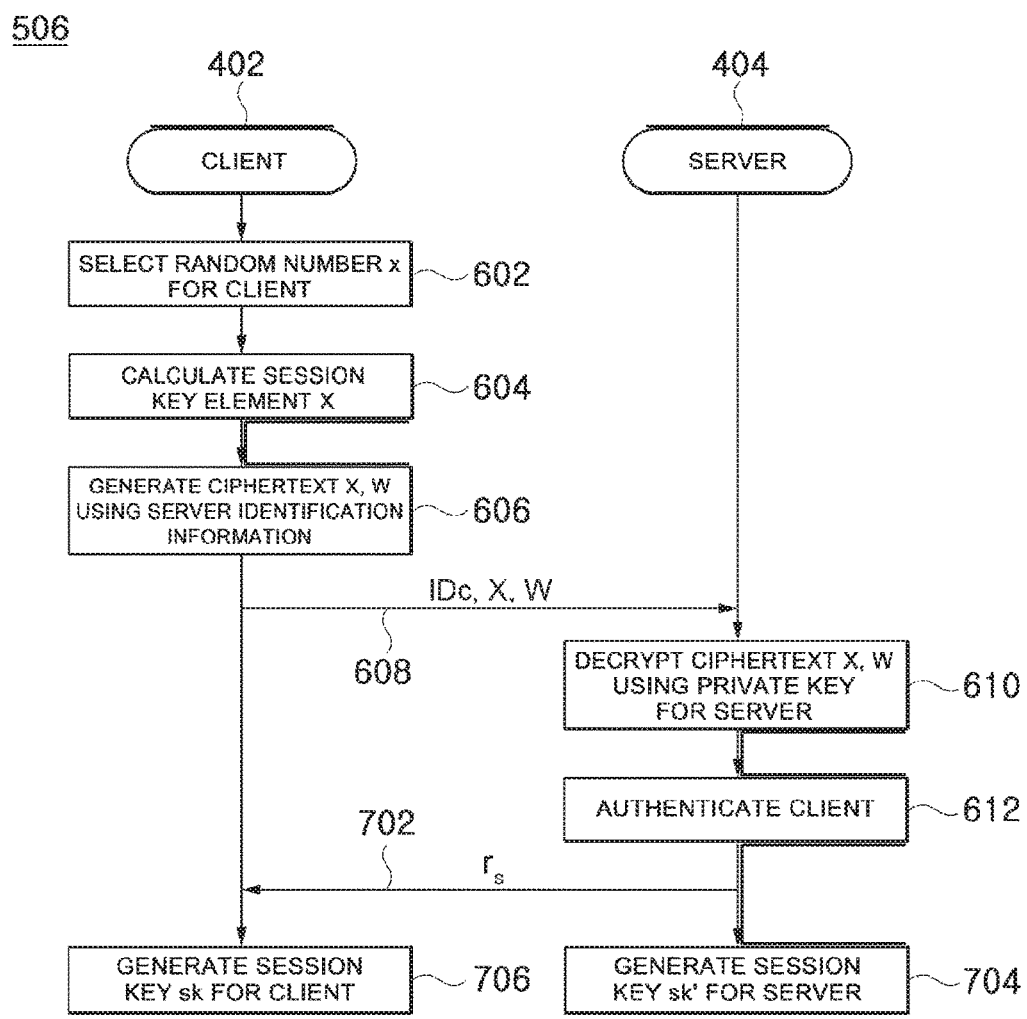
FIG. 7 is a flowchart for describing in detail an authentication and key exchange process of an authentication-information-based authentication algorithm according to a third embodiment of the present disclosure.

FIG. 7 is a flowchart for describing an authentication and key exchange process (S506) according to a third embodiment of the present disclosure. In the shown flowchart, S602 to S612 shown using the same reference numbers as shown in FIG. 6 are the same as those of the second embodiment, and thus their description will be omitted.

According to the third embodiment, when the authentication of the client 402 is completed in S612, the server 404 transmits a random message $r_s$ to the client 402. The random message $r_s$ is used to generate a session key. That is, according to the third embodiment, a 1-pass based protocol may be expanded to a 2-pass based protocol through the transmission of the random message $r_s$.

In S704, the server 404 generates a session key sk' for the server 404 using information generated or exchanged in the previous steps.

In detail, the server 404 generates the session key sk' for the server 404 by hashing a character string including one or more of the client identification information IDc, the server identification information IDs, the encrypted character string W, the session key element X, the random message $r_s$, and the encryption element D' for the server 404. For example, the session key sk' for the server 404 may be generated using Equation 22 below:

$$sk' = H(IDc, IDs, W, X, r_s, D'). \quad \text{[Equation 22]}$$

In S706, the client 402 also generates a session key sk for the client 402 using the information generated or exchanged in the previous steps.

In detail, the client 402 generates the session key sk for the client 402 by hashing a character string including one or more of the client identification information IDc, the server identification information IDs, the encrypted character string W, the session key element X, the random message $r_s$, and the encryption element D for the client 402. For example, the session key sk for the client 402 may be generated using Equation 23 below:

$$sk = H(IDc, IDs, W, X, r_s, D). \quad \text{[Equation 23]}$$

As described above, since the encryption element D for the client 402 is the same as the encryption element D' for the server 404, the session key sk for the client 402 is also the same as the session key sk' for the server 404. That is, through the above-described process, the client 402 and the server 404 may share a session key for safe communication therebetween without directly transmitting or receiving the key.

According to embodiments of the present disclosure, a client may be efficiently and safely authenticated using authentication information of a user, and in particular by performing an initial authentication of a client in a server, a distributed denial-of-service (DDoS) attack may be more effectively blocked.

According to embodiments of the present disclosure, it is also possible to set the number of communications needed to authenticate a client and generate a session key to be 1-pass or 2-pass, thus minimizing the amount of traffic in the authentication process.

Embodiments of the present disclosure may include a computer-readable storage medium including a program for performing methods described in this specification on a computer. The computer-readable recording medium may include a program instruction, a local data file, a local data structure, or a combination thereof. The medium may be designed and configured specifically for the present disclosure, or can be widely known to and used by one skilled in the art of computer software. Examples of the computer-readable recording medium include a magnetic medium, such as a hard disk, a floppy disk, and a magnetic tape, an optical recording medium, such as a compact disc ream-only memory (CD-ROM), a digital versatile disc (DVD), etc., a magneto-optical medium such as a floptical disk, and a hardware device specially configured to store and perform a program instruction, such as a read-only memory (ROM), a random access memory (RAM), a flash memory, etc. Examples of the program instruction include a high-level language code executable by a computer with an interpreter, in addition to a machine language code made by a compiler.

Although the disclosure has been described with reference to exemplary embodiments, it should be understood by those skilled in the art that various changes may be made without departing from the spirit or scope of the disclosure.

Thus, the scope of the present disclosure is to be determined by the following claims and their equivalents, and shall not be restricted or limited by the foregoing detailed description.

What is claimed is:

1. A system for key exchange based on user authentication information, the system comprising:
   a client configured to generate a ciphertext corresponding to authentication information of a user using a random number for the client and server identification information; and
   a server configured to decrypt the ciphertext received from the client using a private key for the server corresponding to the server identification information to restore the authentication information, authenticate the client using the restored authentication information, and generate a session key for the server corresponding to a session key for the authenticated client,
   wherein the server identification information is information that is assigned to identify the server over a network,
   wherein the client is further configured to generate the ciphertext by generating an encryption element for the client from the server identification information and the random number for the client using following equation:

$$D=(H(ID_S))^x$$

where D is the encryption element for the client, IDs is the server identification information, x is the random number of the client, and H is a one-way hash value.

2. The system of claim 1, wherein the client calculates a first session key element from the random number for the client and combines the authentication information with the encryption element for the client to generate an encrypted character string.

3. The system of claim 2, wherein the encrypted character string is calculated by an exclusive-OR (XOR) of the authentication information and the encryption element for the client.

4. The system of claim 2, wherein the server receives the ciphertext including the first session key element and the encrypted character string from the client, calculates an encryption element for the server from the private key for the server and the first session key element, and restores the authentication information from the encrypted character string using the encryption element for the server.

5. The system of claim 4, wherein the encryption element for the server is calculated using a following equation:

$$D'=X^{Ks}$$

where D' is the encryption element for the server, X is the first session key element, and Ks is the private key of the server.

6. The system of claim 4, wherein the authentication information is restored through an XOR operation of the received encrypted character string and the encryption element for the server.

7. The system of claim 4, wherein the server authenticates the client according to whether the restored authentication information is the same as authentication information of the user that is pre-stored in the server.

8. The system of claim 4, wherein,
   the client generates the session key for the client,
   the server transmits a random message to the client when the client is authenticated, and
   the session key for the server and the session key for the client additionally include the random message.

9. The system of claim 2, wherein, when the client is authenticated, the server calculates a second session key element from a random number for the server and generates a third session key element for the server from the random number for the server and the first session key element.

10. The system of claim 9, wherein the third session key element for the server is calculated by raising a base of the first session key element to a power of the random number for the server.

11. The system of claim 9, wherein the client receives the second session key element from the server and generates a third session key element for the client and the session key for the client from the received second session key element.

12. The system of claim 11, wherein the third session key element for the client is calculated by raising a base of the second session key element to a power of the random number for the client.

13. A method for key exchange based on user authentication information, the method comprising:
   generating, by a client, a ciphertext corresponding to authentication information of a user using a random number for the client and server identification information;
   decrypting, by a server, the ciphertext received from the client using a private key for the server corresponding to the server identification information to restore the authentication information;
   authenticating, by the server, the client using the restored authentication information; and
   generating, by the server, a session key for the server corresponding to a session key for the client when the client is authenticated,
   wherein the server identification information is information that is assigned to identify the server over a network, wherein the generating of the ciphertext comprises generating an encryption element for the client from the server identification information and the random number for the client using following equation:

$$D=(H(\text{ID}_S))^x$$

where D is the encryption element for the client, IDs is the server identification information, x is the random number of the client, and H is a one-way hash value.

14. The method of claim 13, wherein the generating of the ciphertext further comprises:
    calculating a first session key element from the random number for the client; and
    combining the authentication information with the encryption element for the client to generate an encrypted character string.

15. The method of claim 14, wherein the encryption character string is calculated by an exclusive-OR (XOR) of the authentication information and the encryption element for the client.

16. The method of claim 14, wherein the restoring of the authentication information further comprises:
    receiving the ciphertext including the first session key element and the encrypted character string from the client;
    calculating an encryption element for the server from the private key for the server and the first session key element; and
    restoring the authentication information from the encrypted character string using the encryption element for the server.

17. The method of claim 16, wherein the encryption element for the server is calculated using a following equation:

$$D'=X^{Ks}$$

where D' is the encryption element for the server, X is the first session key element, and Ks is the private key for the server.

18. The method of claim 16, wherein the restoring of the authentication information from the encryption character string comprises restoring the authentication information through an XOR operation of the received encrypted character string and the encryption element for the server.

19. The method of claim 16, wherein the authenticating comprises authenticating the client according to whether the restored authentication information is the same as authentication information of the user that is pre-stored in the server.

20. The method of claim 16, wherein the session key for the server is a hash value of a character string including one or more of client identification information, the server identification information, the encrypted character string, the first session key element, and the encryption element for the server.

21. The method of claim 20, wherein the client generates the session key for the client composed of the hash value of the character string including one or more of the client identification information, the server identification information, the encrypted character string, the first session key element, and the encryption element for the client.

22. The method of claim 20, wherein,
    the server transmits a random message to the client when the client is authenticated, and
    the session key for the server and the session key for the client additionally include the random message.

23. The method of claim 14, wherein the generating of the session key of the server further comprises:
    calculating a second session key element from a random number for the server; and
    generating a third session key element for the server from the random number for the server and the first session key element.

24. The method of claim 23, wherein the third session key element for the server is calculated by raising a base of the first session key element to a power of the random number for the server.

25. The method of claim 23, wherein the client receives the second session key element from the server and generates a third session key element for the client and the session key for the client from the received second session key element.

26. The method of claim 25, wherein the third session key element for the client is calculated by raising a base of the second session key element to a power of the random number for the client.

27. The method of claim 25, wherein the session key for the client is a hash value of a character string including one or more of client identification information, the server identification information, the encrypted character string, the first session key element, the second session key element, the encryption element for the client, and the third session key element for the client.

28. The method of claim 23, wherein the session key for the server is a hash value of a character string including one or more of client identification information, the server identification information, the encrypted character string, the first session key element, the second session key element, the encryption element for the server, and the third session key element for the server.

29. A computer program stored in a non-transitory computer readable medium that is combined with hardware and configured to execute a method, the method comprising:
    generating a ciphertext corresponding to authentication information of a user of a client using a random number for the client and server identification information;
    decrypting the ciphertext received from the client using a private key for the server corresponding to the server identification information to restore the authentication information;
    authenticating the client using the restored authentication information; and
    generating a session key for the server corresponding to a session key for the client when the client is authenticated,
    wherein the server identification information is information that is assigned to identify the server over a network,
    wherein the generating of the ciphertext comprises generating an encryption element for the client from the server identification information and the random number for the client using following equation:

$$D=(H(\text{ID}_S))^x$$

where D is the encryption element for the client, IDs is the server identification information, x is the random number of the client, and H is a one-way hash value.

* * * * *